S. E. FRAZIER.
CHURN.

No. 187,754. Patented Feb. 27, 1877.

Witnesses.
Fred. G. Dieterich
E. C. Walford

Inventors.
S. E. Frazier
by Daniel Breed
atty.

UNITED STATES PATENT OFFICE.

SAMUEL E. FRAZIER, OF IRONTON, WISCONSIN.

IMPROVEMENT IN CHURNS.

Specification forming part of Letters Patent No. 187,754, dated February 27, 1877; application filed November 13, 1876.

*To all whom it may concern:*

Be it known that I, SAMUEL E. FRAZIER, of Ironton, in the county of Sauk and State of Wisconsin, have invented certain new and useful Improvements in Churns; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
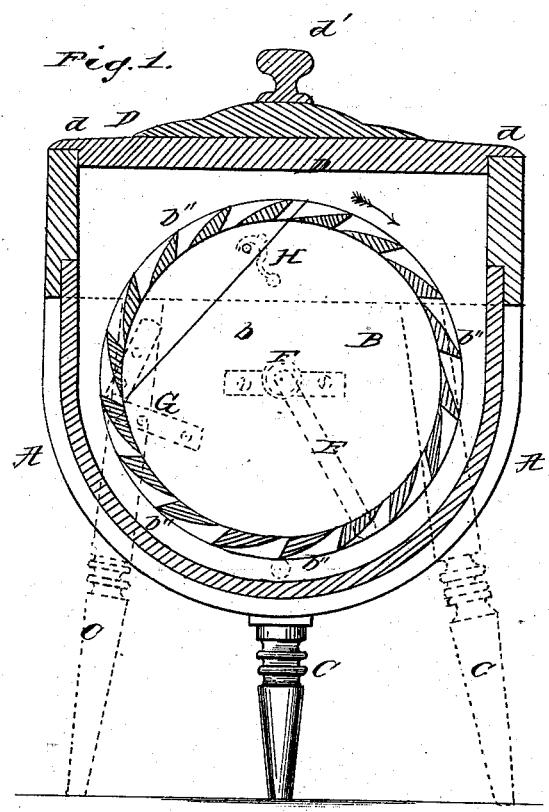
Figure 2:

In the accompanying drawings, Figure 1 is a vertical transverse section of my improved churn, and Fig. 2 is a detached cross-section of one of the floats.

My invention consists of a novel construction of wheel or beater, in combination with trough or box having a curved or semicircular bottom, all of which will be fully understood by the following description.

In the accompanying drawings, A represents the trough or box for receiving and holding the cream or milk, and B is the beater or wheel. The bottom of the box is made semicircular or curved, as shown in the lower part of Fig. 1.

This box may be supported on three or four legs, C, as convenient, so as to stand steadily, either on a level or on an uneven floor.

The cover D should be provided with a shoulder, $d$, like the jamb of a door, so as to shut closely, and thus prevent the cream or milk from flowing out in churning. This cover, if fitted closely, will not need any fastening; but it may be provided with buttons or other fastenings, if necessary. It has a knob or handle, $d'$, for convenience and ornament. It is made of two pieces of wood, the grain of one piece crossing that of the other, so as to prevent the cover from warping.

The wheel or beater B consists of two end pieces or disks, $b$, and a circle of floats, $b''$, made thicker in front, and with a broad or flat and oblique surface, which strikes the cream or milk with a stroke which will rupture the butter cells or globules and rapidly complete the process of churning. These floats are wedge-shaped, and the sharpest edge of the wedge is set behind, so that there is little resistance of the cream against the float, except the stroke of the front of the floats of the beater or wheel B.

The beater or wheel B is turned or rotated in the direction indicated by the arrow above the beater.

The crank E serves as an axis for one end of the beater, and an adjustable screw-bolt, F, serves to support the other end of the same. Both of these are made removable, so as to take the beater from the box or trough when desired, for either removing the butter or washing the churn.

In the process of churning, the butter accumulates in the beater, which is made in two sections, connected by hinges G, (shown in dotted lines,) and provided with a hasp or hasps, H, (seen in dotted lines,) so as to be opened for the removal of the butter.

Having described my invention, I claim—

1. The beater B, made in two sections, and having wedge-shaped floats $b$, substantially in the manner and for the purposes set forth.

2. The combination of the beater B with the box A, having a curved or semicircular bottom, substantially as set forth.

In testimony that I claim the foregoing as my own I affix my signature in presence of two witnesses.

SAMUEL E. FRAZIER.

Witnesses:
 N. H. AUSTIN,
 J. V. MULLINS.